US005716316A

United States Patent [19]

Cartier et al.

[11] Patent Number: 5,716,316

[45] Date of Patent: Feb. 10, 1998

[54] TREATMENT OF FLY ASH PRODUCED BY A WASTE INCINERATOR AND CONTAINING CHLORIDES OF TOXIC METALS

[75] Inventors: René Cartier, Le Pontet; Thierry Longuet, Tresques; Roger Boen, St. Alexandre; Jean-Claude Bres, Mondragon, all of France

[73] Assignee: Commissariat a l'Energie Atomique, Paris, France

[21] Appl. No.: 647,244

[22] Filed: May 9, 1996

[30] Foreign Application Priority Data

May 18, 1995 [FR] France .................................. 95 05909

[51] Int. Cl.[6] .......................................... B09B 3/00

[52] U.S. Cl. ......................... 588/256; 65/134.8; 405/128; 588/236; 588/248; 588/900

[58] Field of Search ........................... 65/134.8; 588/231, 588/234, 236, 248, 252, 256, 257, 900; 405/128

[56] References Cited

U.S. PATENT DOCUMENTS

| | | | |
|---|---|---|---|
| 4,737,356 | 4/1988 | O'Hara et al. . | |
| 5,041,398 | 8/1991 | Kauser et al. . | |
| 5,284,636 | 2/1994 | Goff et al. | 588/256 X |
| 5,347,073 | 9/1994 | Hochleitner et al. | 588/256 |
| 5,424,042 | 6/1995 | Mason et al. | 588/900 X |
| 5,482,528 | 1/1996 | Angell et al. | 588/257 X |
| 5,516,974 | 5/1996 | Sasae et al. | 588/256 |
| 5,521,132 | 5/1996 | Talmy et al. | 588/256 X |

FOREIGN PATENT DOCUMENTS 2 697 451 5/1994 France .

OTHER PUBLICATIONS

Patent Abstracts of Japan, vol. 10, No. 004 (C-322), Jan. 9, 1986, JP-A-60 165326, Aug. 28, 1985.

*Primary Examiner*—George A. Suchfield
*Attorney, Agent, or Firm*—Oblon, Spivak, McClelland, Maier & Neustadt, P.C.

[57] ABSTRACT

This invention relates to a process for treating fly ash produced by a waste incinerator and containing chlorides of toxic metals, which includes a step consisting of subjecting said fly ash to a phosphating reaction, at high temperature, to convert the chlorides of toxic metals into phosphates, the phosphating reaction being obtained by the addition of a reactant comprising a phosphorus compound, characterised in that said phosphorus compound is a non-metallic compound and in that the chlorinated products obtained are discharged in a gaseous form. It also relates to an installation for implementing this process.

10 Claims, 1 Drawing Sheet

TREATMENT OF FLY ASH PRODUCED BY A WASTE INCINERATOR AND CONTAINING CHLORIDES OF TOXIC METALS

BACKGROUND OF THE INVENTION

1. Field of the Invention

This invention relates to the treatment of fly ash produced by a waste incinerator and containing chlorides of toxic metals.

2. Discussion of the Background

Purification residues from the incineration fumes of domestic waste (called REFIOM), as well as fly ash produced from industrial or nuclear waste, may contain significant quantities of chemical compounds containing toxic metals.

By toxic metals is meant metals considered as polluting the environment. They include heavy metals (such as zinc), alkali metals and alkaline-earth metals (such as caesium and strontium) and radioactive metals. These toxic metals are found in waste made up of domestic waste or the refuse from conventional or nuclear industries.

During the incineration of waste, chemical reactions occur, causing in particular the formation of chemical compounds of these toxic metals. These chemical compounds are found in the REFIOM, which must be treated to prevent the dispersion of these noxious compounds in the environment.

It is known to treat the fly ash to make it inert for cementation and vitrification. Vitrification is a technique which enables the volume of the incineration residues to be reduced while confining the toxic elements within a stable matrix.

Most of the waste to be incinerated contains chlorine which will form chlorides and notably chlorides of heavy metals. Domestic waste potentially contains much of it, for example from articles made of polyvinyl chloride (PVC).

These toxic metal chlorides are soluble and harmful to the environment. The fly ash which contains them cannot be treated effectively as such since chlorine is not totally confinable. It is therefore vital to make it inert for the environment.

The presence of chlorine in the fly ash reduces the properties of the bituminised or cementised waste particularly with respect to its resistance to leaching out.

Chlorides of heavy metals cannot be incorporated into a vitreous lattice, of the kind proposed by the vitrification technique, having good confining properties.

To attempt to alleviate this, two types of treatment have been suggested. A first type of treatment process includes a wet process to remove the heavy metals, followed by a process to make the residue and the heavy metals inert. A second type of vitrification treatment process involves either recovery of the heavy metal chlorides in the treatment of the gases and an operation to make these heavy metals inert or to recover them, or trapping the heavy metal chlorides, in situ, in a viscous non-miscible phase, situated above the vitrified phase (see, for example document FR-A-2 697 451).

Until now, the treatments suggested have proved difficult to implement and expensive.

SUMMARY OF THE INVENTION

So as to remedy these disadvantages, there is provided, according to this invention, a process of phosphating the metallic chlorides contained in the REFIOM, at elevated temperature. This process, carried out in a reactor, allows obtaining the heavy metals in a different chemical form (phosphate instead of chloride). The product obtained, very rich in phosphates, can be passed into a vitrification reactor. The phosphates are easily incorporated into the vitreous lattice. They give compounds which are considerably less volatile than the corresponding metal chlorides.

Therefore, an object of the invention is a process for treating fly ash produced by a waste incinerator and containing chlorides of toxic metals, which includes a step of subjecting said fly ash to a phosphating reaction, at high temperature, in order to convert the toxic metal chlorides into phosphates, the phosphating reaction being achieved by addition of a reactant comprising a phosphorus compound, characterised in that said phosphorus compound is a non-metallic compound, and in that the chlorinated products obtained are discharged in gaseous form. Preferably, the reaction temperature is in the range of 500° to 1,200° C.

The reactant can be chosen from the group made up of phosphoric acid, phosphoric anhydride and ammonium phosphate. It can also be an organic phosphorus compound.

The object of the invention is also an installation for the treatment of fly ash produced by a waste incinerator, and containing chlorides of toxic metals, characterised in that it includes a reactor comprising means for introducing said fly ash, means for introducing a reactant comprising a phosphorus compound, heating means which allow a phosphating reaction to be obtained between the fly ash and the phosphorus compound, at a temperature between 500° and 1,200° C. means for extracting phosphated ash and means for discharging the gas produced by the reaction between the fly ash and the phosphorus compound.

This installation may further include a dust collector, connected to said gas discharging means, in order to filter and recover the dust contained in the discharged gases. This dust collector can be a dry dust filter.

Advantageously, the installation reactor can further comprise means for introducing said dusts in order to submit them again to said reaction.

It can also include a device for cooling the fumes discharged through the discharge means.

If the heating means comprise at least one burner, such burner can also act as a means for introducing the reactant.

The reactor can be of the type built around a rotating tube.

According to an alternative embodiment of the invention, the reactor can comprise a melting furnace provided with means for effecting a vitrification process, the melting furnace allowing the phosphating of the fly ash and the vitrification of the phosphated ash to be carried out consecutively.

BRIEF DESCRIPTION OF THE DRAWINGS

The invention will be better understood and other advantages and particular features will become apparent upon reading the following description, given by way of a non-limiting example, in conjunction with the appended drawings, in which.

DESCRIPTION OF THE PREFERRED EMBODIMENTS

Figure 1:
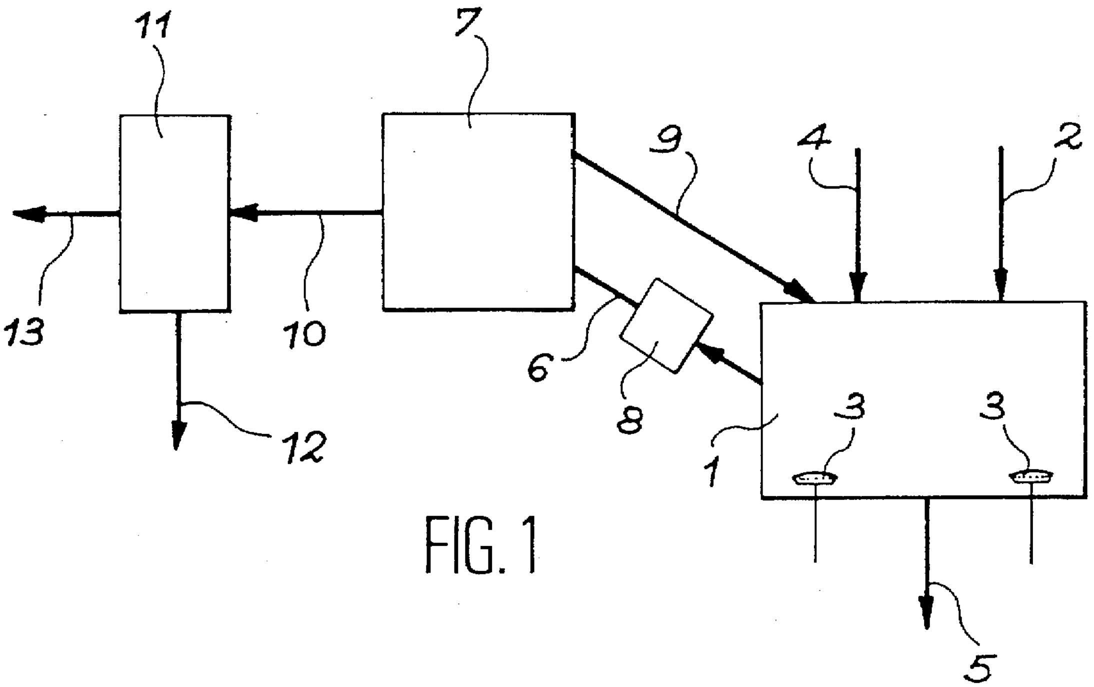
FIG. 1 illustrates in a schematic way, a first variant of an installation for the treatment of fly ash according to the invention.

The installation shown in FIG. 1 includes a reactor 1 for phosphating the volatile chlorides. Such reactor is well known in the field of chemistry. It is, for example, of the type built around a rotating tube. It allows a thermal treatment to be carried out at a temperature between 500° and 1,200° C. The reactant containing the phosphorus in an appropriate form (an organic phosphate for example) can be introduced into the reactor in solid, liquid or gaseous form using inlet pipe 2. If required, the reactant can be introduced by using a burner, for example, one of burners 3 being used to heat the interior of the reactor.

Another inlet pipe 4 allows the introduction of the fly ash into the reactor.

The phosphated ash drops down to the bottom of the reactor where they can be extracted by a slide box or an automatic extraction device shown under reference 5.

Due to the effect of heat and of the reactant, the metal chlorides contained in the fly ash are converted into phosphates. The gases formed during the reaction are discharged via discharge pipe 6, carrying along with them dust which may include unreacted metal chlorides.

The gases discharged via pipe 6 are directed into dust collector 7 after passing through a fume cooling device 8. This dust collector 7 is, for example, a dry filtration system, recovering the dust so as to send it back again into reactor 1 using pipe 9. This recycling allows unreacted metal chlorides to be fed back into the reactor.

The dust-free fumes are discharged from dust collector 7 using pipe 10 which passes them into a system 11 for neutralising the acid gases contained in the fumes. At 12 non-toxic salts are recovered while the gases exit at 13.

The phosphated ash produced can be easily vitrified by known techniques.

The phosphating process according to this invention can also be associated with a cementation or bituminisation process which leads to a final waste of better quality since it is free of chlorine. Finally, if the phosphating process leads to a waste product which is sufficiently insoluble, this waste can be stockpiled as it stands.

Figure 2:
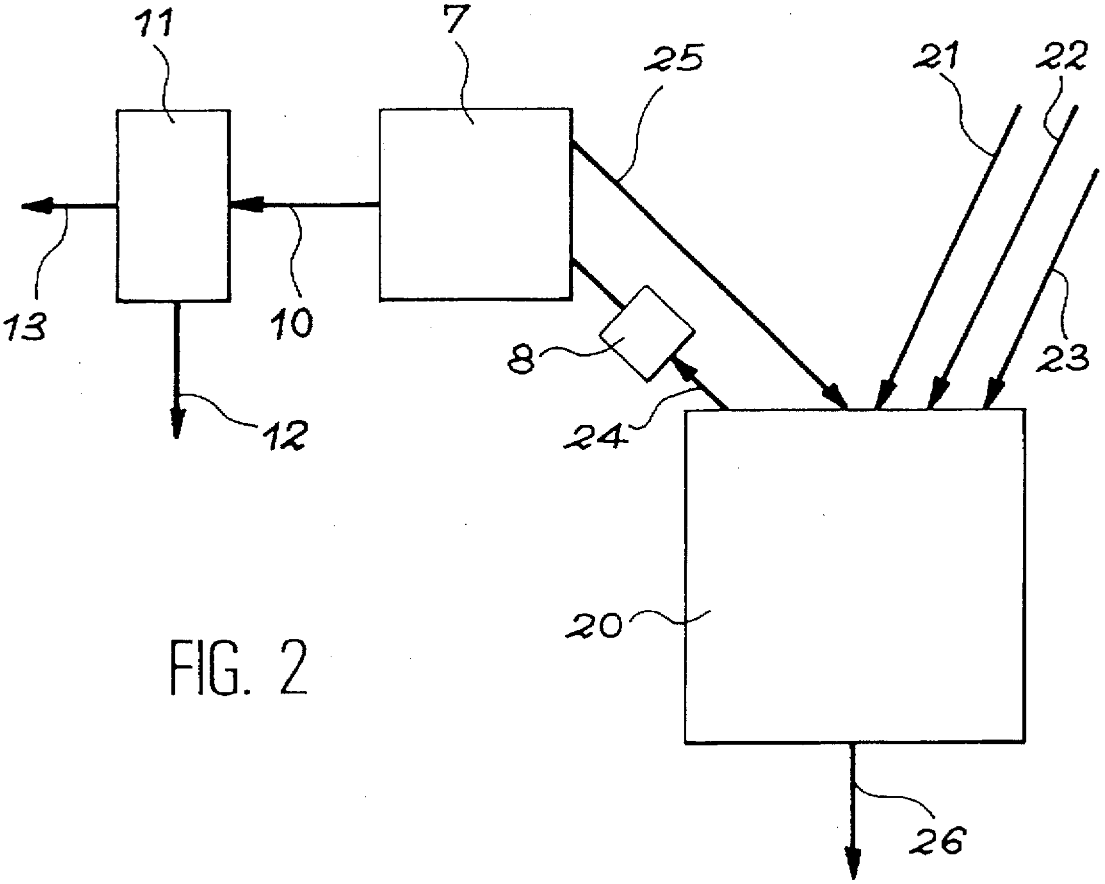
FIG. 2 illustrates, in a schematic way, a second variant of an installation for the treatment of fly ash according to the invention.

In the variant shown in FIG. 2, a melting furnace 20 has been substituted for the phosphating reactor, which allows the phosphating and the vitrification to be carried out in the same reactor, the treatment of the gases being identical to that in the preceding case.

Thus, furnace 20 in FIG. 2 simultaneously receives the fly ash via feed pipe 21, the phosphorus containing reactant via feed pipe 22 and a vitrification additive via feed pipe 23.

As previously, a pipe 24 discharges the gases produced by the reaction and which carry with them dust still liable to contain metal chlorides. After passing into the dust collector 7, via fume cooling device 8, the dust is recycled into the furnace via pipe 25. At 26 the glass confining the phosphated ash is recovered.

What is claimed as new and desired to be secured by Letters Patent of the United Sates is:

1. A process for the treatment of fly ash produced by a waste incinerator and containing chlorides of toxic metals, including a stage consisting of subjecting said fly ash to a phosphating reaction, at high temperature, in order to convert the toxic metal chlorides into phosphates, the phosphating reaction being obtained by addition of a reactant comprising an organic compound of phosphorous, in which said organic compound of phosphorus is a non-metallic compound and in which the chlorinated products obtained are discharged in a gaseous form.

2. A process according to claim 1, in which the reaction temperature is in the range of 500° to 1,200° C.

3. An installation for the treatment of fly ash produced by a waste incinerator and containing chlorides of toxic metals, comprising a reactor including means for introducing said fly ash, means for introducing a reactant comprising a compound of phosphorus, heating means which allow a phosphating reaction to be obtained between the fly ash and the phosphorus compound at a temperature between 500° and 1,200° C., means for extracting the phosphated ash and means for discharging the gases produced by the reaction between the fly ash and the phosphorus compound.

4. An installation according to claim 3, further comprising a dust collector connected to said gas discharging means, in order to filter and recover dust contained in the discharged gases.

5. An installation according to claim 4, in which the dust collector is a dry dust collector.

6. An installation according to claim 4, in which the reactor further includes means for introducing said dust in order to subject it again to said reaction.

7. An installation according to claim 3, further comprising a device for cooling the fumes discharged by the discharging means.

8. An installation according to claim 3, in which the heating means comprise at least one burner, such burner also acting as a means for introducing the reactant.

9. An installation according to any one of claims 3 to 8, in which the reactor comprises a rotating tube.

10. An installation according to any one of claims 3 to 8, in which said reactor is made up of a melting furnace provided with means allowing a vitrification process to be carried out.

* * * * *